(12) United States Patent
Park et al.

(10) Patent No.: US 11,140,650 B2
(45) Date of Patent: Oct. 5, 2021

(54) METHOD AND APPARATUS FOR DETERMINING LOCATION OF BASE STATION IN MOBILE COMMUNICATION SYSTEM

(71) Applicant: Samsung Electronics Co., Ltd, Suwon-si (KR)

(72) Inventors: Jinsoo Park, Suwon-si (KR); Hyunpyo Lee, Seongnam-si (KR); Jaeyoon Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 2 days.

(21) Appl. No.: 16/641,619

(22) PCT Filed: Jul. 13, 2018

(86) PCT No.: PCT/KR2018/007975
§ 371 (c)(1),
(2) Date: Feb. 24, 2020

(87) PCT Pub. No.: WO2019/039736
PCT Pub. Date: Feb. 28, 2019

(65) Prior Publication Data
US 2021/0168754 A1 Jun. 3, 2021

(30) Foreign Application Priority Data
Aug. 24, 2017 (KR) .................. 10-2017-0107336

(51) Int. Cl.
*H04W 72/04* (2009.01)
*H04W 64/00* (2009.01)
*H04W 56/00* (2009.01)

(52) U.S. Cl.
CPC ....... *H04W 64/003* (2013.01); *H04W 56/001* (2013.01); *H04W 72/048* (2013.01)

(58) Field of Classification Search
CPC ............. H04W 64/00; H04W 72/0453; H04W 72/042; H04W 72/0493
See application file for complete search history.

(56) References Cited

U.S. PATENT DOCUMENTS

| 8,781,503 B2 | 7/2014 | Ferguson |
| 2007/0002813 A1 | 1/2007 | Tenny et al. |

(Continued)

FOREIGN PATENT DOCUMENTS

| CN | 101102593 A | 1/2008 |
| CN | 101248626 A | 8/2008 |

(Continued)

OTHER PUBLICATIONS

International Search Report dated Oct. 16, 2018 in connection with International Patent Application No. PCT/KR2018/007975, 2 pages.

(Continued)

*Primary Examiner* — Michael T Vu

(57) ABSTRACT

The present invention relates to a communication technique for convergence of IoT technology and a 5G communication system for supporting a higher data transfer rate beyond a 4G system, and a system therefor. Also, the present invention provides a method for determining a location of a base station, the method comprising the steps of: receiving, from a terminal, a first message including location information of the terminal; and determining location information of the base station on the basis of the received location information of the terminal.

10 Claims, 12 Drawing Sheets

(56) References Cited

U.S. PATENT DOCUMENTS

| | | |
|---|---|---|
| 2007/0021122 A1 | 2/2007 | Lane et al. |
| 2008/0139217 A1 | 6/2008 | Alizadeh-Shabdiz et al. |
| 2008/0299992 A1 | 12/2008 | Eitan et al. |
| 2009/0316655 A1* | 12/2009 | Prakash ............ H04W 36/0088 370/331 |
| 2014/0038642 A1* | 2/2014 | Edge .................. H04W 64/003 455/456.2 |
| 2014/0200025 A1 | 7/2014 | Wouhavbi et al. |
| 2015/0124630 A1 | 5/2015 | Zorlu et al. |
| 2015/0245176 A1 | 8/2015 | Venkatraman et al. |

FOREIGN PATENT DOCUMENTS

| | | |
|---|---|---|
| CN | 101268631 A | 9/2008 |
| CN | 101438270 A | 5/2009 |
| CN | 101682903 A | 3/2010 |
| CN | 104137632 A | 11/2014 |

OTHER PUBLICATIONS

Written Opinion of the International Searching Authority dated Oct. 16, 2018 in connection with International Patent Application No. PCT/KR2018/007975, 7 pages.

The First Office Action dated Nov. 4, 2020 in connection with Chinese Application No. 201880054795.0, 24 pages.

\* cited by examiner

METHOD AND APPARATUS FOR DETERMINING LOCATION OF BASE STATION IN MOBILE COMMUNICATION SYSTEM

CROSS-REFERENCE TO RELATED APPLICATIONS

This application is a 371 of International Application No. PCT/KR2018/007975 filed on Jul. 13, 2018, which claims priority to Korean Patent Application No. 10-2017-0107336 filed on Aug. 24, 2017, the disclosures of which are herein incorporated by reference in their entireties.

BACKGROUND

1. Field

The disclosure relates to a method and apparatus capable of determining the location of a Home Evolved Node B (HeNB) that provides a mobile communication service in an indoor environment.

2. Description of Related Art

Since the commercial deployment of 4G communication systems, efforts have been made to develop improved 5G or pre-5G communication systems to meet the ever increasing demand for wireless data traffic. As such, 5G or pre-5G communication systems are also called "beyond 4G network" or "post LTE system". To achieve higher data rates, 5G communication systems consider utilization of the mmWave band (e.g., 60 GHz band). To decrease path loss and increase the transmission distance in the mmWave band, various technologies including beamforming, massive multiple-input multiple-output (massive MIMO), full dimensional MIMO (FD-MIMO), array antennas, analog beamforming, and large scale antennas are considered for 5G communication systems. To improve system networks in 5G communication systems, technology development is under way regarding evolved small cells, advanced small cells, cloud radio access networks (cloud RANs), ultra-dense networks, device-to-device (D2D) communication, wireless backhaul, moving networks, cooperative communication, coordinated multi-points (CoMP), reception interference cancellation, and the like. In addition, advanced coding and modulation (ACM) schemes such as hybrid FSK and QAM modulation (FQAM) and sliding window superposition coding (SWSC), and advanced access technologies such as filter bank multi carrier (FBMC), non-orthogonal multiple access (NOMA), and sparse code multiple access (SCMA) are also under development for 5G communication systems.

Meanwhile, the Internet is evolving from a human centered network where humans create and consume information into the Internet of Things (IoT) where distributed elements or things process and exchange information. There has also emerged the Internet of Everything (IoE) technology that combines IoT technology with big data processing technology through connection with cloud servers. To realize IoT services, base technologies related to sensing, wired/wireless communication and network infrastructure, service interfacing, and security are needed, and technologies interconnecting things such as sensor networks, machine-to-machine (M2M) or machine type communication (MTC) are under development. In IoT environments, it is possible to provide intelligent Internet technology services, which collect and analyze data created by interconnected things to add new values to human life. Through convergence and combination between existing information technologies and various field technologies, IoT technology may be applied to various areas such as smart homes, smart buildings, smart cities, smart or connected cars, smart grids, health-care, smart consumer electronics, and advanced medical services.

Accordingly, various attempts are being made to apply 5G communication systems to IoT networks. For example, sensor networks and machine-to-machine or machine type communication are being realized by use of 5G communication technologies including beamforming, MIMO, and array antennas. Application of cloud RANs to big data processing described above may be an instance of convergence of 5G communication technology and IoT technology.

Meanwhile, the HeNB, which is mainly installed indoors, should be able to calculate or determine its location for the following purpose.

The HeNB needs to calculate its location and register the location in a database such as a server of the service provider, so that the HeNB can be configured in a manner suitable for the information on the frequency of the service provider available at the location. In the case of E911 being one of location-based services, the terminal or the HeNB to which the terminal is connected should provide location information with a given level or higher of accuracy.

As described above, when the location information of the base station (more specifically, HeNB mainly installed indoors) cannot be obtained, the base station may fail to configure a mobile communication service provided by the service provider as being available.

In addition, even if the location information of the base station can be obtained, the user's convenience of using the base station may change according to the time required for the location information. Hence, in the related art, a method of mounting a GPS transceiver inside the base station has been considered.

However, even if the GPS signal is used, there are many shadow regions in an indoor environment, which limits the installation location of the base station. Also, mounting the GPS transceiver inside the base station is undesirable in terms of material cost.

SUMMARY

According to the disclosure, there is provided a location determination method of a base station. The location determination method may include: receiving, from a terminal, a first message including location information of the terminal; and determining location information of the base station based on the received location information of the terminal.

The location determination method may further include: determining whether a state of the first message satisfies a preset criterion; and transmitting, to the terminal, a second message for adjusting a location of the terminal, in case that the state of the first message does not satisfy the preset criterion.

The location determination method may further include: transmitting, to an operator server, a third message including the determined location information of the base station; and receiving, from the operator server, a fourth message including frequency band information determined based on the location information of the base station.

The location determination method may further include: identifying whether pre-stored location information of the base station is existed in the base station; identifying whether the pre-stored location information is valid, in case that the pre-stored location information of the base station is existed; and determining, the pre-stored location information as the location information of the base station, in case that the pre-stored location information is valid.

The base station may determine whether the pre-stored location information of the base station is valid based on time information stored in the base station.

The base station may receive, from a plurality of terminals, each of a plurality of first messages including location information of a corresponding terminal. Determining location information of the base station may include: determining a priority of each of the plurality terminals based on a state for each of the plurality of the first messages; selecting a terminal to be used for determining location information of the base station based on the determined priority; and determining location information of the base station based on location information of the selected terminal.

The location determination method may further include: receiving, from a network server, a fifth message including time information or frequency information; and performing synchronization based on the received time information or the received frequency information.

The location determination method may further include storing the determined location information of the base station as the location information of the base station. The base station may be a Home Evolved Node B (HeNB).

According to the disclosure, there is provided a location determination method of a terminal. The location determination method may include: receiving, from a base station, a request message including a location information request; determining location information of the terminal based on the location information request; and transmitting, to the base station, a first message including the determined location information of the terminal.

The location determination method may further include: receiving, from the base station, a second message for adjusting a location of the terminal; executing a pre-installed application in the terminal based on the second message; and displaying the second message through the pre-installed application.

The first message may further include time information of the terminal or information on a satellite communicating with the terminal. The base station may be a Home Evolved Node B (HeNB).

According to the disclosure, there is provided a base station. The base station may include: a transceiver configured to, from a terminal, a first message including location information of the terminal; and a controller configured to determine location information of the base station based on the received location information of the terminal.

The controller may be configured to determine whether a state of the first message satisfies a preset criterion. If the state of the first message fails to satisfy the preset criterion, the transceiver may be configured to transmit a second message for adjusting a location of the terminal to the terminal.

The transceiver may be configured to: transmit, to an operator server, a third message including the determined location information of the base station; and receive, from the operator server, a fourth message including frequency band information determined based on the location information of the base station.

The base station may further include a memory to store location information of the base station. The controller may be configured to: identify whether pre-stored location information of the base station is existed in the base station; identify whether the pre-stored location information is valid in case that the pre-stored location information of the base station is existed; and determine, the pre-stored location information as the location information of the base station, in case that the pre-stored location information is valid.

The controller may be configured to: identify whether the pre-stored location information of the base station is valid based on time information stored in the memory; and store the determined location information of the base station as the location information of the base station in the memory.

The transceiver may be configured to receive, from a plurality of terminals, each of a plurality of first messages including location information of a corresponding terminal. The controller may be configured to: determine a priority of each of the plurality terminals based on a state for each of the plurality of the first messages; select a terminal to be used for determining location information of the base station based on the determined priority; and determine location information of the base station based on location information of the selected terminal.

The transceiver may be configured to receive a fifth message including time information or frequency information from a network server. The controller may be configured to achieve synchronization based on the received time information or frequency information. The base station may be a Home Evolved Node B (HeNB).

According to the disclosure, there is provided a terminal. The terminal may include: a transceiver configured to receive, from a base station, a request message including a location information request and transmit, to the base station, a first message including the determined location information of the terminal; and a controller configured to determine location information of the terminal based on the location information request.

The terminal may further include a display disposed on one surface of the terminal. The transceiver may be configured to receive a second message for adjusting a location of the terminal from the base station. The controller may be configured to execute a pre-installed application in the terminal based on the second message and control the display to output a result of an execution of the application.

The first message may further include time information of the terminal or information on a satellite communicating with the terminal. The base station may be a Home Evolved Node B (HeNB).

According to an embodiment of the disclosure, it is possible to remove coverage limitations of the base station due to indoor reception constraints. According to an embodiment of the disclosure, as a GPS antenna or a GPS transceiver need not be present in the base station, the manufacturing cost and time of the base station can be reduced.

In addition, according to an embodiment of the disclosure, the base station may receive the frequency and time information through the network server and perform synchronization based thereon, so that the base station may not require a separate device for synchronization.

DETAILED DESCRIPTION

Figure 1:
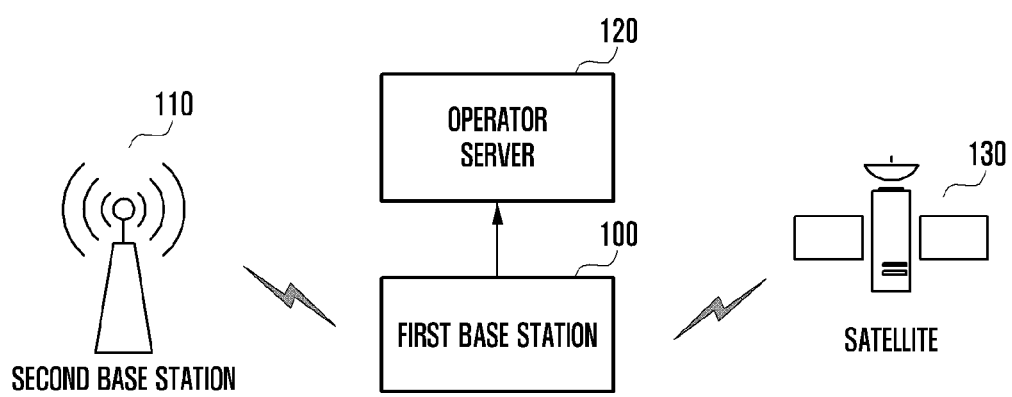
FIG. 1 illustrates the configuration of a mobile communication system according to the related art.

Descriptions of functions and structures well known in the art and not directly related to the disclosure may be omitted for clarity and conciseness without obscuring the subject matter of the disclosure.

In the drawings, some elements are exaggerated, omitted, or only outlined in brief, and thus may be not drawn to scale. The same or similar reference symbols are used throughout the drawings to refer to the same or like parts.

The aspects, features, and advantages of certain embodiments of the disclosure will be more apparent from the following detailed description taken in conjunction with the accompanying drawings. The description of the various embodiments is to be construed as exemplary only and does not describe every possible instance of the disclosure. It should be apparent to those skilled in the art that the following description of various embodiments of the disclosure is provided for illustrative purposes only and not for the purpose of limiting the disclosure as defined by the appended claims and their equivalents. The same reference symbols are used throughout the description to refer to the same parts.

Meanwhile, it is known to those skilled in the art that blocks of a flowchart (or sequence diagram) and a combination of flowcharts may be represented and executed by computer program instructions. These computer program instructions may be loaded on a processor of a general purpose computer, special purpose computer, or programmable data processing equipment. When the loaded program instructions are executed by the processor, they create a means for carrying out functions described in the flowchart. As the computer program instructions may be stored in a computer readable memory that is usable in a specialized computer or a programmable data processing equipment, it is also possible to create articles of manufacture that carry out functions described in the flowchart. As the computer program instructions may be loaded on a computer or a programmable data processing equipment, when executed as processes, they may carry out steps of functions described in the flowchart.

A block of a flowchart may correspond to a module, a segment or a code containing one or more executable instructions implementing one or more logical functions, or to a part thereof. In some cases, functions described by blocks may be executed in an order different from the listed order. For example, two blocks listed in sequence may be executed at the same time or executed in reverse order.

In the description, the word "unit", "module", or the like may refer to a software component or hardware component such as an FPGA or ASIC capable of carrying out a function or an operation. However, "unit" or the like is not limited to hardware or software. A unit or the like may be configured so as to reside in an addressable storage medium or to drive one or more processors. Units or the like may refer to software components, object-oriented software components, class components, task components, processes, functions, attributes, procedures, subroutines, program code segments, drivers, firmware, microcode, circuits, data, databases, data structures, tables, arrays, or variables. A function provided by a component and unit may be a combination of smaller components and units, and it may be combined with others to compose large components and units. Components and units may be configured to drive a device or one or more processors in a secure multimedia card.

FIG. 1 illustrates the configuration of a mobile communication system according to the related art.

With reference to FIG. 1, a first base station 100 communicates with a second base station 110. The first base station 100 may communicate with a satellite 130 by using a GPS transceiver mounted therein, through which the first base station 100 may identify its location.

The first base station 100 may transmit the location determined through the GPS transceiver to a server 120 of the operator. Thereby, the first base station 100 may register its location in the database of the server 120 of the service provider, that is, the operator.

The first base station in FIG. 1 may include various types of base stations, and a Home Evolved Node B (HeNB) may be a representative example. That is, the first base station may be a pico base station or a small cell base station, and may be installed inside a building according to an embodiment of the disclosure. On the other hand, the second base station 110 may be a macro base station communicating with the first base station.

As described above, in order for the first base station 100 to provide a communication service to the user, location information of the first base station should be provided to the operator server 120.

This is because the frequency band used to provide the service may vary depending on the location where the first base station 100 is placed. For example, if the frequency band provided in region A is 1 GHz and the frequency band provided in region B is 1.5 GHz, the first base station 100 should notify its location (region A or region B) to the operator server 120, and the operator server 120 may provide a corresponding frequency band to the first base station 100.

Additionally, in the case of the E911 system providing an emergency service, the terminal or the base station to which the terminal is connected should provide location information with a given level or higher of accuracy. Hence, the base station using the E911 service needs to know its location accurately.

In the related art, by installing a GPS transceiver for communicating with the satellite 130 in the first base station 100, the first base station 100 can identify its own location and provide its location information to the operator server 120.

The configuration of the first base station 100 including a GPS transceiver will be described in more detail with reference to FIG. 2.

Figure 2:
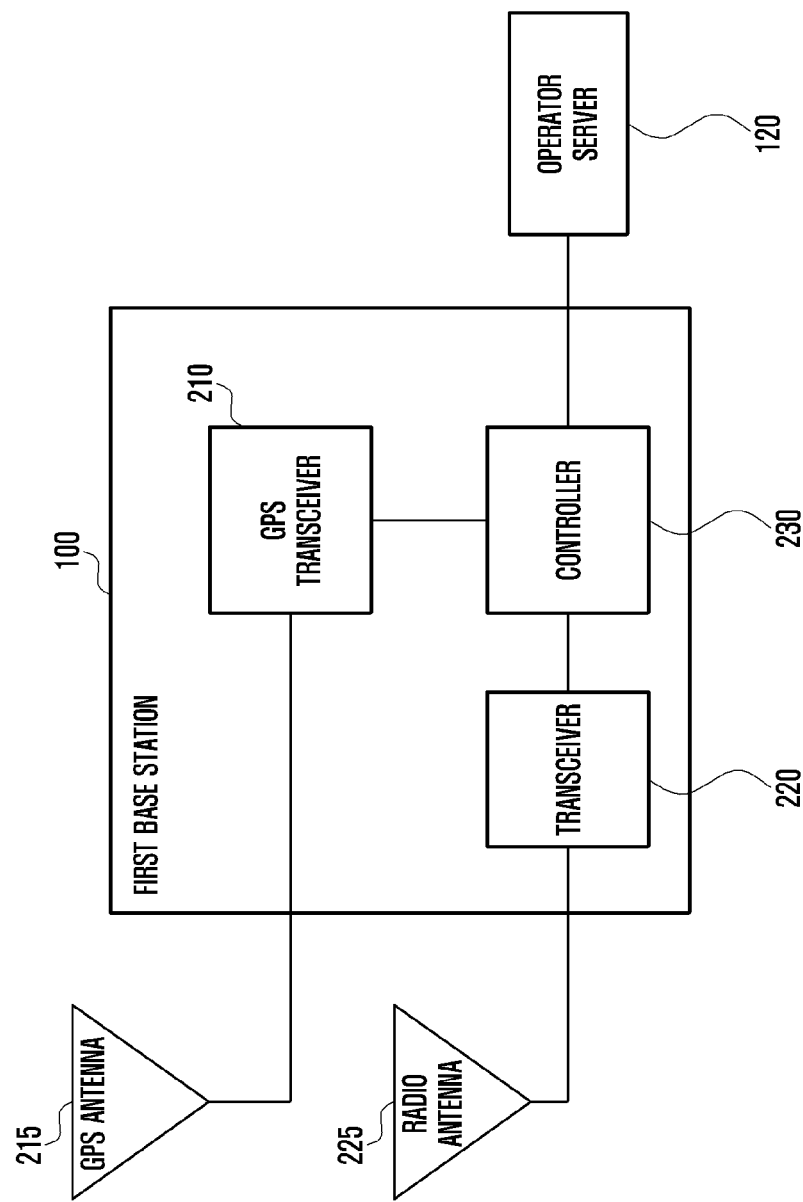
FIG. 2 illustrates the configuration of a first base station according to the related art.

FIG. 2 illustrates the configuration of the first base station according to the related art.

The first base station 100 according to the related art may include a GPS transceiver 210 described above, a GPS antenna 215 connected to the GPS transceiver 210 to communicate with a satellite, a controller 230 for controlling the overall operation of the first base station 100, a transceiver 220 configured to receive a signal transmitted to the first base station 100 and transmit a signal to the outside, and a radio antenna 225 connected to the transceiver 220 to transmit and receive a signal.

The first base station 100 may receive its location through the GPS transceiver 210 and may transmit the received location information to the operator server 120 through the controller 230.

However, such a configuration of the first base station 100 has problems in various aspects. Determining the location of the first base station using the GPS transceiver 210 is not suitable for a situation where the shadow area of the GPS signal is wide, such as indoors.

In particular, it is not easy to adjust the position of the first base station installed indoors once the position thereof is determined.

That is, to improve the reception sensitivity of the GPS signal, the first base station should be installed at a place where the signal transmitted from the external base station can be most smoothly delivered, such as the glass inside a building.

However, the glass has a metallic property and recently includes a film for UV protection. Hence, even if the first base station is placed on the glass, it is difficult to significantly improve the GPS signal reception sensitivity of the first base station.

Accordingly, the disclosure proposes a method that can determine the location of the first base station in a manner different from the related art and deliver the location information of the first base station to the operator server 120.

As will be described later, according to the disclosure, because the GPS transceiver 210 and the GPS antenna 215 are not required in the first base station 100, the material cost for manufacturing the first base station can be reduced.

In addition, the problem (synchronization problem) that may occur due to deletion of the GPS transceiver can also be flexibly coped without adding a separate component. Hence, the base station according to the disclosure may have advantageous effects in various aspects compared to the related art base station.

Figure 3:
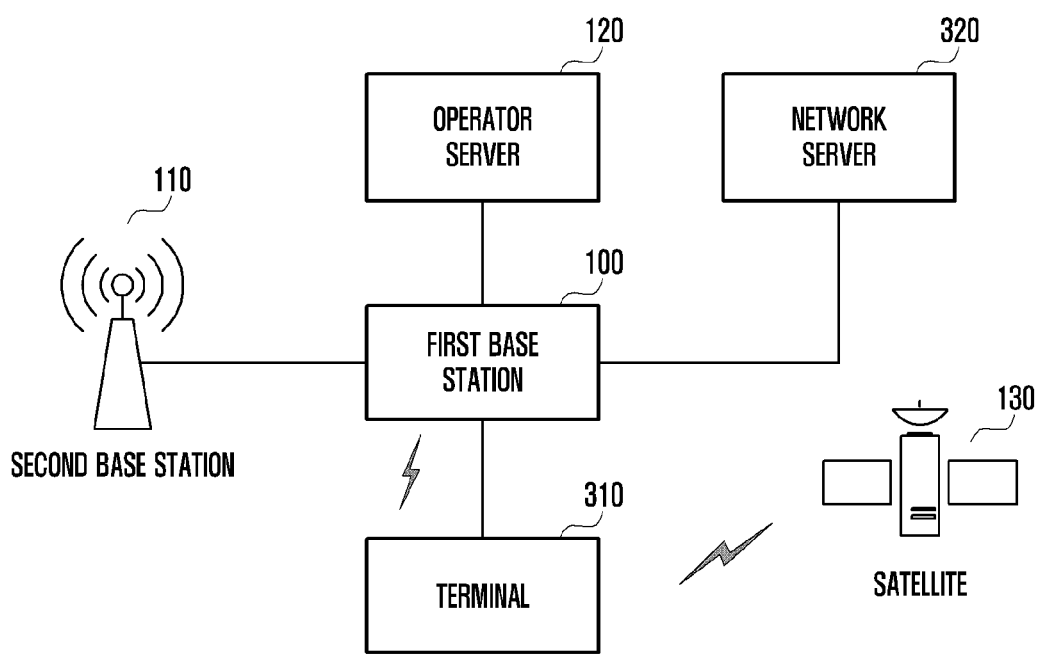
FIG. 3 illustrates the configuration of a mobile communication system according to the disclosure.

FIG. 3 illustrates the configuration of a mobile communication system according to the disclosure.

The mobile communication system according to the disclosure may include a first base station 100 without including a GPS transceiver (described later in more detail with reference to FIG. 7), a second base station 110 communicating with the first base station, and an operator server 120 that receives location information of the first base station and provides a mobile communication service to the first base station.

Meanwhile, in comparison with the configuration of FIG. 1, a terminal 310 communicating with the satellite 130 and the first base station 100, and a network server 320 connected to the first base station 100 are added to the configuration of FIG. 3.

In this case, the first base station 100 may receive synchronization information from the network server 320 to achieve time and frequency synchronization for the first base station. In addition, the first base station 100 may receive the location information of the base station to be transmitted to the operator server 120 from the terminal 310. The operation of the added elements (terminal and network server) will be described in more detail later.

Figure 4:
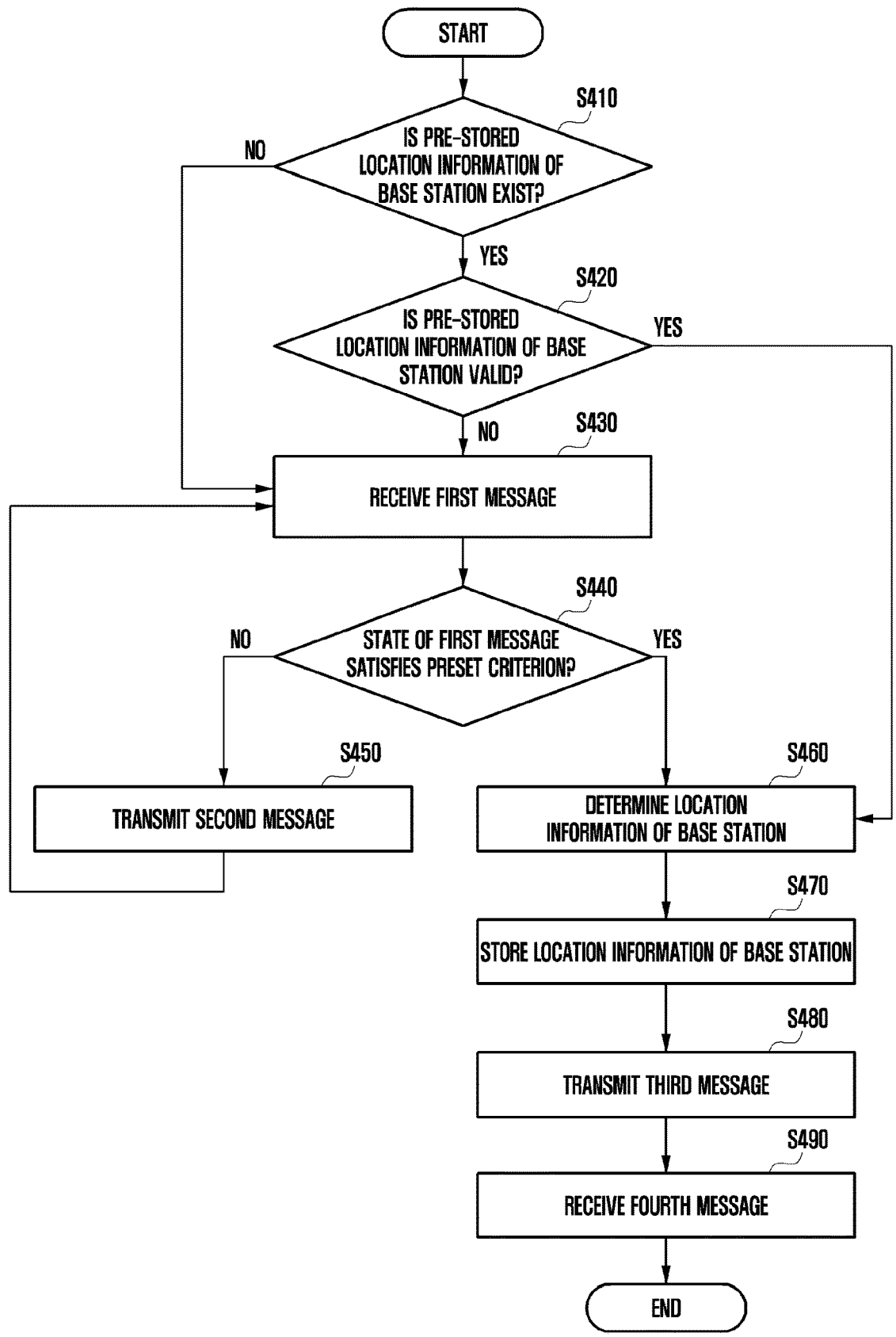
FIG. 4 is a flowchart of a location determination method for the base station according to the disclosure.

FIG. 4 is a flowchart of a location determination method for the base station according to the disclosure.

At step S410, the base station (e.g., first base station in FIG. 3, or more specifically HeNB) may determine whether location information of the base station is pre-stored.

The location information of the base station may be stored in a separate memory of the base station. If the location information of the base station is pre-stored in the memory and the location information is valid (S420), the base station may transmit the location information stored in the memory to the operator server.

Meanwhile, step S410 may be triggered under various conditions. For example, whenever power is turned on, the base station may determine whether there is already stored location information and operate according to the determination result. The operator server may itself determine that the location information of the base station is needed and send a request for location information to the base station, triggering step S410. The base station may periodically trigger step S410 at regular intervals.

Upon determining that pre-stored location information is present at step S410, at step S420, the base station may determine the validity of the pre-stored location information. As described above, if the pre-stored location information is valid, there is no need to determine the location information of the base station separately. Hence, upon determining that the pre-stored location information is valid, at step S460, the base station may determine the pre-stored location information to be the location information thereof.

On the other hand, if the pre-stored location information is not valid, the base station needs to determine the location information thereof separately. As the fact that the location information stored in the memory is not valid is the same as the fact that location information is not present in the memory at step S410, the base station may start an operation for determining location information thereof at step S430.

There may be various schemes for determining the validity of the location information at step S420. For example, the validity of the location information stored in the memory may be determined based on the time when the location information is stored in the memory.

Specifically, if the time at which the location information of the base station is stored is 2017/08/07 09:30 (year/month/day hour:minute) and the current time of determining the validity of the location information at step S420 is 2017/08/07 09:32, it may be determined that the difference between the time at which the location information is stored and the current time is not large. That is, in such a case, there is a low possibility that there is a difference between the current location of the base station and the location indicated by the stored location information. Hence, it may be determined at step S420 that the pre-stored location information of the base station is valid.

One the other hand, if the time at which the location information of the base station is stored is 2017/08/07 09:30 and the current time of determining the validity of the location information at step S420 is 2017/08/08 07:30, it may be determined that the difference between the time at which the location information is stored and the current time is large. That is, in such a case, there is a high possibility that there is a difference between the current location of the base station and the location indicated by the stored location information. Hence, it may be determined at step S420 that the pre-stored location information of the base station is not valid.

A description has been given for illustration of a scheme for determining the validity of the pre-stored location information based on the time when the location information is stored. However, the scope of the disclosure should not be limited only thereto.

From a viewpoint of a person skilled in the art, another embodiment for determining the validity of the location information of the base station may be added. For example, besides the storage time of the location information, the validity of the pre-stored location information of the base station may be determined based on the signal sensitivity corresponding to the previously stored location information. (That is, if the signal sensitivity corresponding to the pre-stored location information is higher than or equal to a preset threshold, it may be determined that the pre-stored location information is valid. If the signal sensitivity corresponding to the pre-stored location information is lower than the preset threshold, it may be determined that the pre-stored location information is not valid.)

Upon determining that pre-stored location information of the base station is not present at step S410, or upon determining that pre-stored location information is present but the pre-stored location information is not valid at step S420, at step S430, the base station may receive a first message from the terminal.

The first message may include location information of the terminal. As will be described later, the terminal is generally equipped with a GPS transceiver to provide a location-based service to the user. That is, the terminal can identify its location through the GPS transceiver.

Meanwhile, as described above, because the base station according to the disclosure does not include a GPS transceiver, the base station cannot determine its location directly. Therefore, the disclosure proposes a method by which the base station obtains location information of a terminal communicating with the base station and indirectly determines the location information of the base station based on the location information of the terminal.

After receiving the first message from the terminal at step S430, at step S440, the base station may determine whether the state of the first message satisfies a preset criterion. Step S440 is a step for evaluating the reliability of the location information of the terminal included in the first message.

The preset criterion may be specified in terms of various conditions. For example, the reception sensitivity of the first message may be used as the preset criterion. A good reception sensitivity of the first message received by the base station may be interpreted as indicating that the terminal is placed in proximity to the base station. That is, it means that the location information of the base station is not significantly different from the location information of the terminal.

Specifically, if the preset criterion (i.e., threshold reception sensitivity) is 10 dB or more and the state of the first message (i.e., reception sensitivity of the first message) is 12 dB, as the terminal having transmitted the first message is placed in proximity to the base station, the base station may determine at step S440 that the state of the first message satisfies the preset criterion.

On the other hand, if the threshold reception sensitivity is 10 dB or more and the reception sensitivity of the first message is 2 dB, as the terminal having transmitted the first message is placed far from the base station, the base station may determine that the state of the first message fails to satisfy the preset criterion. That is, the base station may determine that the location of the terminal indicated by the first message received from the terminal is not similar to the location of the base station.

A description has been given for illustration of using the reception sensitivity of the first message as the preset criterion. However, the scope of the disclosure should not be limited only thereto. From a viewpoint of a person skilled in the art, another embodiment for the preset criterion may be added. For example, the preset criterion may be set to the elapsed time from the time when the base station transmits a request for the first message to the terminal to the time when the base station receives the first message from the terminal.

If the state of the first message does not satisfy the preset criterion at step S440, as described above, the probability that the location of the terminal is similar to the location of the base station is low. That is, in this case, the reliability of the location information of the terminal is too low to indirectly estimate the location of the base station based on the location of the terminal.

To obtain more reliable location information of the terminal, at step S450, the base station may transmit a second message to the terminal. More specifically, the second message is a message for adjusting the location of the terminal.

That is, the second message is a message that is transmitted by the base station to the terminal to cause the terminal receiving the second message to be moved closer to the base station so as to increase the reliability of the location information of the terminal. A description will be given of the format of the second message and the operation of the terminal based on the second message with reference to FIGS. 8 and 10B.

After transmitting the second message at step S450, the base station may receive the first message again from the terminal whose location is adjusted at step S430. Upon receiving the first message, the terminal may determine whether the state of the first message satisfies the preset criterion again at step S440.

Here, if the terminal is moved to a location close to the base station through step S450, as the location information of the terminal is reliable enough to estimate the location of the base station, it may be determined that the state of the first message satisfies the preset criterion.

However, if the state of the first message does not satisfy the preset criterion, as the location of the terminal is significantly different from the location of the base station, the base station may again transmit the second message for adjusting the location to the terminal at step S450.

If the state of the first message satisfies the preset criterion at step S440, at step S460, the base station may determine the location information thereof. Specifically, as the location information of the terminal that satisfies the preset criterion is highly reliable enough to be estimated as the location information of the base station, the base station may determine the location information of the terminal received through the first message to be the location information of the base station.

Alternatively, at step S460, the location information of the terminal received through the first message may be partially corrected to determine the location information of the base station. For example, if the threshold reception sensitivity as the preset criterion is 10 dB and the reception sensitivity of the first message is 12 dB, the location of the base station may be determined by applying a correction factor (factor A) to the location of the terminal.

As another example, if the threshold reception sensitivity as the preset criterion is 10 dB and the reception sensitivity of the first message is 22 dB, the location of the base station may be determined by applying a correction factor (factor B) to the location of the terminal. Here, as the reliability of the terminal location information is higher when the reception sensitivity of the first message is 22 dB than when the reception sensitivity is 12 dB, factor B may be smaller than factor A.

At step S470, the base station may store the location information thereof determined at step S460. As described above, the location information of the base station stored at step S460 can be used later to determine the presence of pre-stored location information at step S410.

In addition, the location information of the base station stored at step S460 can be used later to determine the validity of the pre-stored location information at step S420. Hence, not only the location information of the base station but also the time at which the location information is determined or the reception sensitivity of the first message may be stored together at step S470.

The preset criterion may be specified in terms of various conditions. For example, the GPS reception sensitivity of the first message may be used as the preset criterion. A good GPS reception sensitivity of the first message received by the base station can be interpreted as indicating that the terminal is well positioned to receive GPS signals. That is, it means that the accuracy and reliability of the location information of the terminal is high.

Specifically, if the preset criterion (i.e., threshold reception sensitivity) is 10 dB or more and the state of the first message (i.e., reception sensitivity of the first message) is 12 dB, as the terminal having transmitted the first message is placed where the GPS signal is good, the base station may determine at step S440 that the state of the first message satisfies the preset criterion.

On the other hand, if the threshold reception sensitivity is 10 dB or more and the reception sensitivity of the first message is 2 dB, as the terminal having transmitted the first message is placed where the GPS signal is relatively poor, the base station may determine that the state of the first message fails to satisfy the preset criterion. That is, the base station may determine that the location of the terminal indicated by the first message received from the terminal is not similar to the location of the base station.

A description has been given for illustration of using the GPS reception sensitivity of the first message as the preset criterion. However, the scope of the disclosure should not be limited only thereto. From a viewpoint of a person skilled in the art, another embodiment for the preset criterion may be added. For example, the preset criterion may be set to the elapsed time from the time when the base station transmits a request for the first message to the terminal to the time when the base station receives the first message from the terminal.

If the state of the first message does not satisfy the preset criterion at step S440, as described above, the probability that the location of the terminal is similar to the location of the base station is low. That is, in this case, the reliability of the location information of the terminal is too low to indirectly estimate the location of the base station based on the location of the terminal.

To obtain more reliable location information of the terminal, at step S450, the base station may transmit a second message to the terminal. More specifically, the second message is a message for adjusting the location of the terminal.

That is, the second message is a message that is transmitted by the base station to the terminal to cause the terminal receiving the second message to be moved closer to a place where the GPS signal is good (typically, by the window) so as to increase the reliability of the location information of the terminal. A description will be given of the format of the second message and the operation of the terminal based on the second message with reference to FIGS. 8 and 10B.

After transmitting the second message at step S450, the base station may receive the first message again from the terminal whose location is adjusted at step S430. Upon receiving the first message, the terminal may determine whether the state of the first message satisfies the preset criterion again at step S440.

Here, if the terminal is moved to a location where the GPS signal is good through step S450, as the location information of the terminal is reliable enough to estimate the location of the base station, it may be determined that the state of the first message satisfies the preset criterion.

However, if the state of the first message does not satisfy the preset criterion, as the terminal is still at a place where the GPS signal is poor, the base station may again transmit the second message for adjusting the location to the terminal at step S450.

At step S480, the base station may transmit a third message including the determined location information to the operator server. Upon receiving the location information of the base station at step S480, the operator server may determine service providing information such as a frequency band to be used by the base station based on the received location information.

Thereafter, at step S490, the base station may receive a fourth message including frequency band information determined by the operator server. Accordingly, the base station can communicate with the terminal using the frequency band information received from the operator server.

Meanwhile, although not shown in FIG. 4, the base station may receive a fifth message including time information or frequency information from the network server and may achieve synchronization based thereon as described with reference to FIG. 3.

In order for the base station to accurately provide the operating frequency band specified by the operator server to the terminal, the base station itself needs to achieve synchronization in the frequency domain and the time domain.

In the related art, the synchronization is achieved by the GPS transceiver installed in the base station. However, in the disclosure, because the GPS transceiver is not installed in the base station, there is provided a method for receiving synchronization information (fifth message) from the network server and achieving synchronization based thereon.

As the synchronization operation is independent of location determination of the base station, it may be performed separately from those operations of the base station described in FIG. 4. Hence, the synchronization operation may be additionally performed at any step of the flowchart shown in FIG. 4.

However, as the synchronization must also be achieved before the base station provides a service to the terminal, it will be desirable for the base station to perform the synchronization operation immediately after the power-on (at step S410 if the trigger condition of step S410 is the power-on of the base station).

Figure 5:
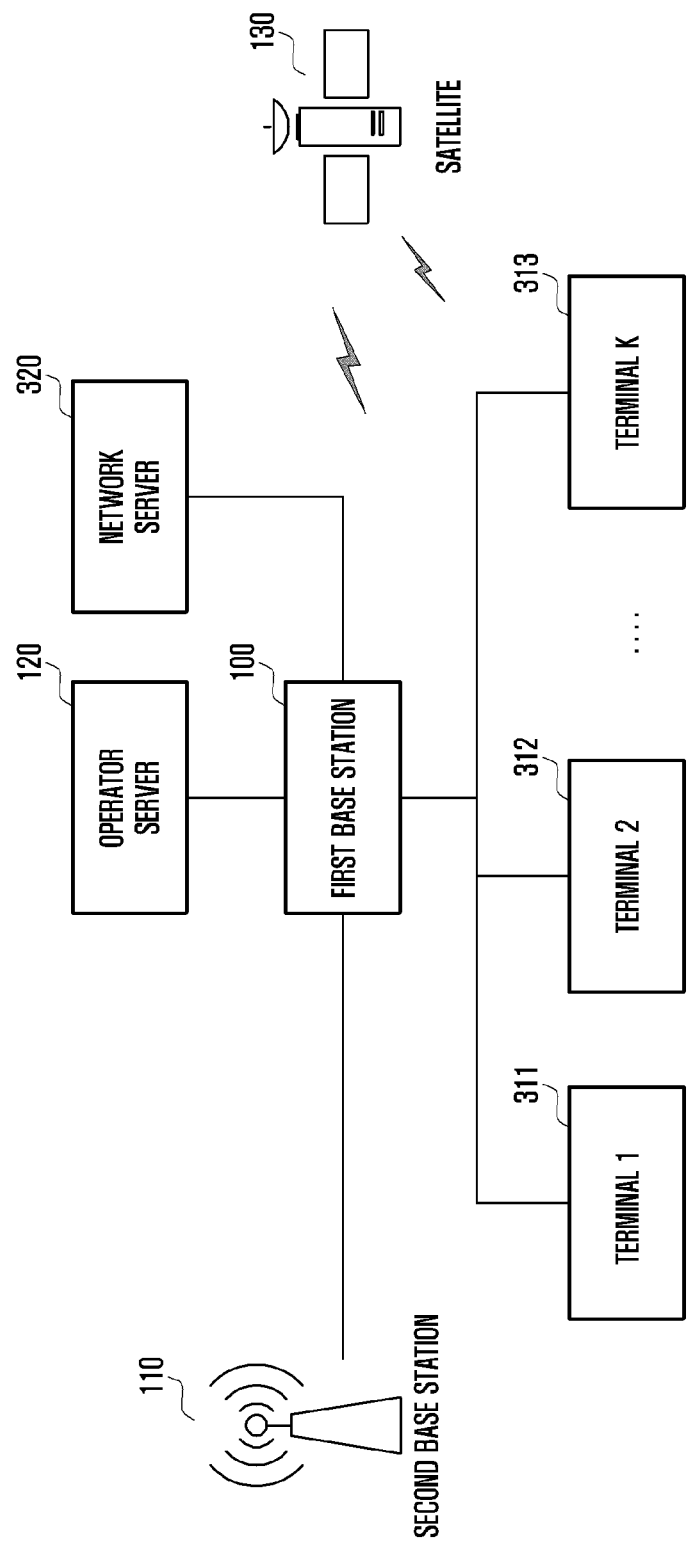
FIG. 5 illustrates the configuration of a mobile communication system when there are a plurality of terminals according to an embodiment of the disclosure.

FIG. 5 illustrates the configuration of a mobile communication system when there are a plurality of terminals according to an embodiment of the disclosure.

In the description of FIGS. 3 and 4, it is assumed that only one terminal communicates with the base station. However, a plurality of terminals may be connected to the base station. FIG. 5 illustrates a case where plural terminals 311, 312, ..., 313 are connected to the first base station 100.

When the mobile communication system of FIG. 5 is compared with the mobile communication system of FIG. 3, it has the same configuration except that the first base station 100 is connected to multiple terminals 311, 312, ..., 313.

The first base station 100 is connected to the second base station 110 being viewed as a macro base station, and is also connected to the operator server 120 for providing a service and the network server 320 for providing synchronization information.

The operation of the base station for determining the location information thereof in the mobile communication system shown in FIG. 5 correspond substantially to the method shown in FIG. 4. (All of the steps in FIG. 4 may be applicable to the configuration shown in FIG. 5 except for the step of determining the location information of the base station, i.e., step S460.)

However, in the mobile communication system of FIG. 5, as the base station receives location information from one or more terminals, contention may arise in the location information determination process of the base station.

Hence, in the mobile communication system shown in FIG. 5, a scheme for resolving such contention is needed. In other words, step S460 in FIG. 4 needs to be further subdivided. This is described in more detail with reference to FIG. 6.

Figure 6:
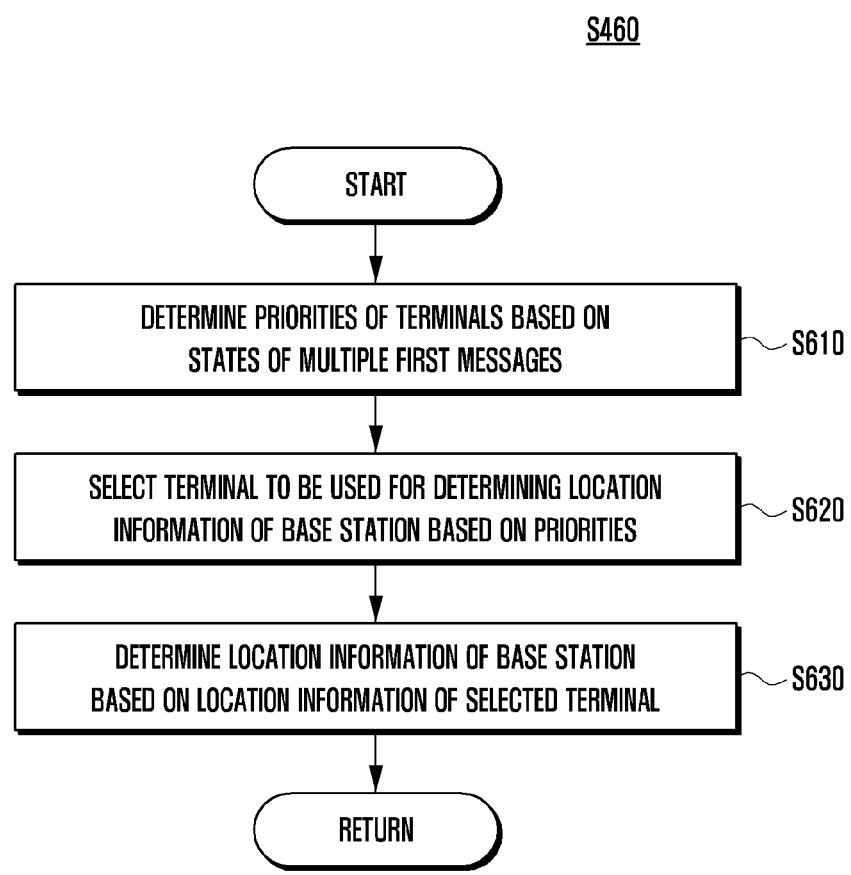
FIG. 6 is a flowchart of a location determination method for the base station when there are a plurality of terminals according to an embodiment of the disclosure.

FIG. 6 is a flowchart of a location determination method for the base station when there are a plurality of terminals according to an embodiment of the disclosure.

FIG. 6 is a detailed flowchart of step S460 described above. When there are plural terminals, the base station may receive multiple first messages from the multiple terminals at step S430 in FIG. 4. Hence, the base station should determine the location information thereof based on multiple pieces of terminal location information included in the multiple first messages.

To this end, at step S610, the base station may determine the priorities of the terminals based on the states of plural first messages received at step S430. As described above, the state of a first message at step S610 may indicate the reception sensitivity of the first message, the time at which the first message is received, or the like.

More specifically, assume a mobile communication system where the base station is connected to three terminals including terminal 1, terminal 2, and terminal 3. In this case, the base station may receive a first message from each of the three terminals. For example, the base station may receive a first message with a reception sensitivity of 12 dB from terminal 1, may receive a first message with a reception sensitivity of 8 dB from terminal 2, and may receive a first message with a reception sensitivity of 17 dB from terminal 3.

As terminal 3 has the best reception sensitivity, it may be predicted that terminal 3 is placed closest to the base station based on the reception sensitivity. Hence, at step S610, the base station may determine the priority of terminal 3 to be 1, determine the priority of terminal 1 to be 2, and determine the priority of terminal 2 having the worst reception sensitivity to be 3.

In another embodiment, the priority of a terminal may be determined based on the time when the first message is received from the terminal. For example, the base station may receive a first message from terminal 1 at 07:30 on 2017/07/05, receive a first message from terminal 2 at 09:20 on 2017/08/07, and receive a first message from terminal 3 at 17:50 on 2017/08/04.

If the current time is 2017/08/07 11:00, as the location information included in the first message received from terminal 2 is the most recent information, the base station may determine that the location information of terminal 2 is the most reliable.

Hence, in this case, at step S610, the base station may determine the priority of terminal 2 to be 1, determine the priority of terminal 3 to be 2, and determine the priority of terminal 1 having transmitted the earliest first message to be 3.

A description has been given for illustration of determining the priority of a terminal based on the reception sensitivity of the first message or the time at which the first message is received. However, the scope of the disclosure should not be limited only thereto. From a viewpoint of a person skilled in the art, another embodiment for determining the priority of a terminal may be added.

At step S620, the base station may select the terminal to be used for determining the location information of the base station based on the priority assigned at step S610. For example, if the priority of terminal 3 is 1, the priority of terminal 1 is 2, and the priority of terminal 2 is 3, the base station may select terminal 3 having the highest priority as a terminal to be used to determine the location information of the base station.

After selecting the terminal to be used for determining the location information of the base station among plural terminals at step S620, at step S630, the base station may determine the location information of the base station based on the location information of the selected terminal. As the operation at step S630 is the same as the operation of the base station at step S460 in FIG. 4, a description on step S630 is omitted.

Meanwhile, unlike the above-described example, the priorities of terminals may not all be determined to be different values at step S610. For example, the reception sensitivity of terminal 1 and terminal 2 may be 17 dB and the reception sensitivity of terminal 3 may be 12 dB.

In this case, when the priority is determined based on the reception sensitivity of the terminal at step S610, contention may occur between terminal 1 and terminal 2. That is, at step S620, a problem may arise as to which terminal among terminal 1 and terminal 2 should be selected as a terminal to be used for determining the location information of the base station.

A description is given of some embodiments that can handle the above problem. A first embodiment is to determine the priority of a terminal based on multiple states of the first message. For example, if there is contention between terminal 1 and terminal 2 when the priority of the terminal has been determined based on the reception sensitivity, the priority of terminal 1 and terminal 2 may be determined based on the time when the first message is received from terminal 1 and terminal 2.

For example, if the base station receives the first message from terminal 1 at 07:30 on 2017/07/05 and receives the first message from terminal 2 at 09:23 on 2017/08/07, although terminal 1 and terminal 2 have the same reception sensitivity, the base station may determine the priority of terminal 2 to be 1 and determine the priority of terminal 1 to be 2.

That is, according to the first embodiment described above, the priority of a terminal may be determined based on plural states (including reception sensitivity and message reception time) of the first message at step S610, and the problem of priority contention between terminals can be solved.

In a second embodiment, if there is priority contention between terminal 1 and terminal 2 with the same priority of 1, the average value of location information of terminal 1 and location information of terminal 2 is calculated based on the first messages received from terminal 1 and terminal 2, and this average value is determined as the location information of the base station.

Because it is not necessary for the base station to consider multiple message states in the second embodiment, it may be advantageous in that the load on the base station may be less compared with the first embodiment.

A description has been given for illustration of two embodiments for handling the priority contention between terminals. However, the scope of the disclosure should not be limited only thereto. From a viewpoint of a person skilled in the art, another embodiment for determining the priority of a terminal may be added. (For example, a third embodiment may be derived by combining the first and second embodiments.)

Figure 7:
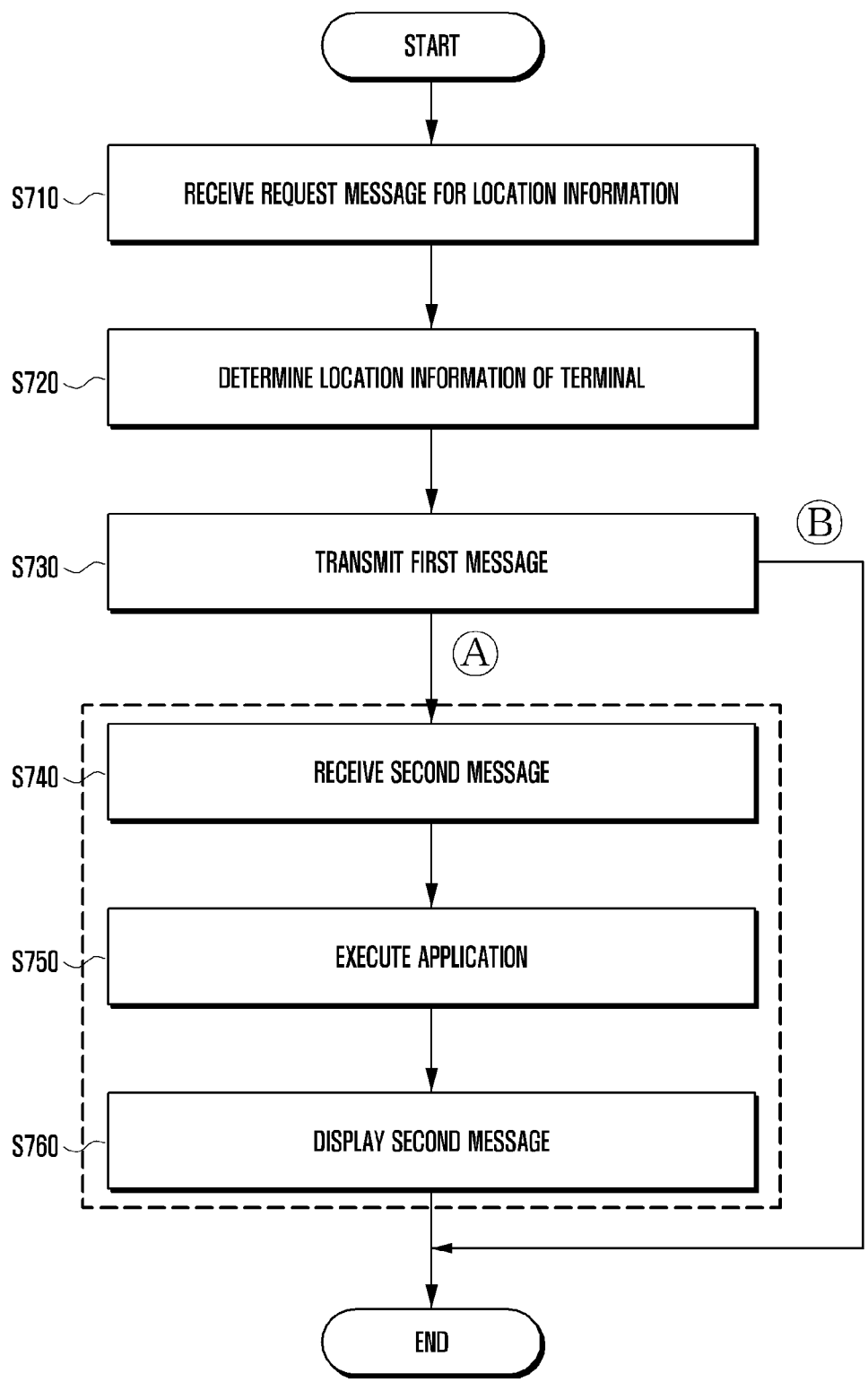
FIG. 7 is a flowchart of a location determination method for the terminal according to the disclosure.

FIG. 7 is a flowchart of a location determination method for the terminal according to the disclosure.

At step S710, the terminal may receive a request message for location information from the base station. As described above with reference to FIG. 4, when the base station is powered on or when the operator server needs location information of the base station, the terminal may receive a request message for location information from the base station.

Upon receiving the request message for location information, at step S720, the terminal may determine the location information thereof. More specifically, as the terminal is embedded with a GPS transceiver to provide a location-based service, the terminal may determine the location information thereof by using the GPS transceiver.

A description has been given for illustration of determining the location of the terminal through a GPS transceiver embedded in the terminal, but the scope of the disclosure extends to a method of determining the location of a terminal universally available to a person skilled in the art.

At step S730, the terminal may transmit a first message containing the location information thereof determined at step S720 to the base station. In addition, after step S730, the terminal may perform action A or action B according to the state of the terminal location information included in the first message.

More specifically, action A is performed when there is a high possibility that the difference between the location of the terminal determined at step S720 and the location of the base station is large. Action B is performed when there is a high possibility that the difference between the location of the terminal determined at step S720 and the location of the base station is small.

In the case of action B, as the location information of the terminal determined at step S720 may be regarded as highly reliable, the terminal ends the procedure after transmitting the first message at step S730 without performing a separate step as in action A.

On the other hand, in the case of action A, that is, when the reliability of the terminal location information determined at step S720 is regarded as low, at step S740, the terminal may receive a second message for adjusting the location thereof.

Upon receiving the second message, at step S750, the terminal may execute an application corresponding to the second message. The corresponding application may be automatically executed by the terminal when the second message is received.

Alternatively, the reception of the second message may be displayed on the display to prompt the user to execute the application.

In addition, the terminal may notify the user of the reception of the second message in the form of sound or vibration to prompt the user to execute the application.

When the application is executed, at step S760, the application may output the second message on the display. This is described in more detail later with reference to FIGS. 10A and 10B.

Although not shown in FIG. 7, when the location of the terminal is adjusted through step S760, the terminal may again receive a request message for location information at step S710, and the terminal may transmit a first message containing the location information thereof to the base station according to the flow of the flowchart of FIG. 7.

In this case, when a preset time has elapsed at step S760, the terminal may receive a request message for location information from the base station once again at step S710. In another embodiment, after the location of the terminal is adjusted, the user or the terminal may transmit a message for terminal location adjustment to the base station, and the base station may transmit a request message for location information to the terminal correspondingly at step S710.

Figure 8:
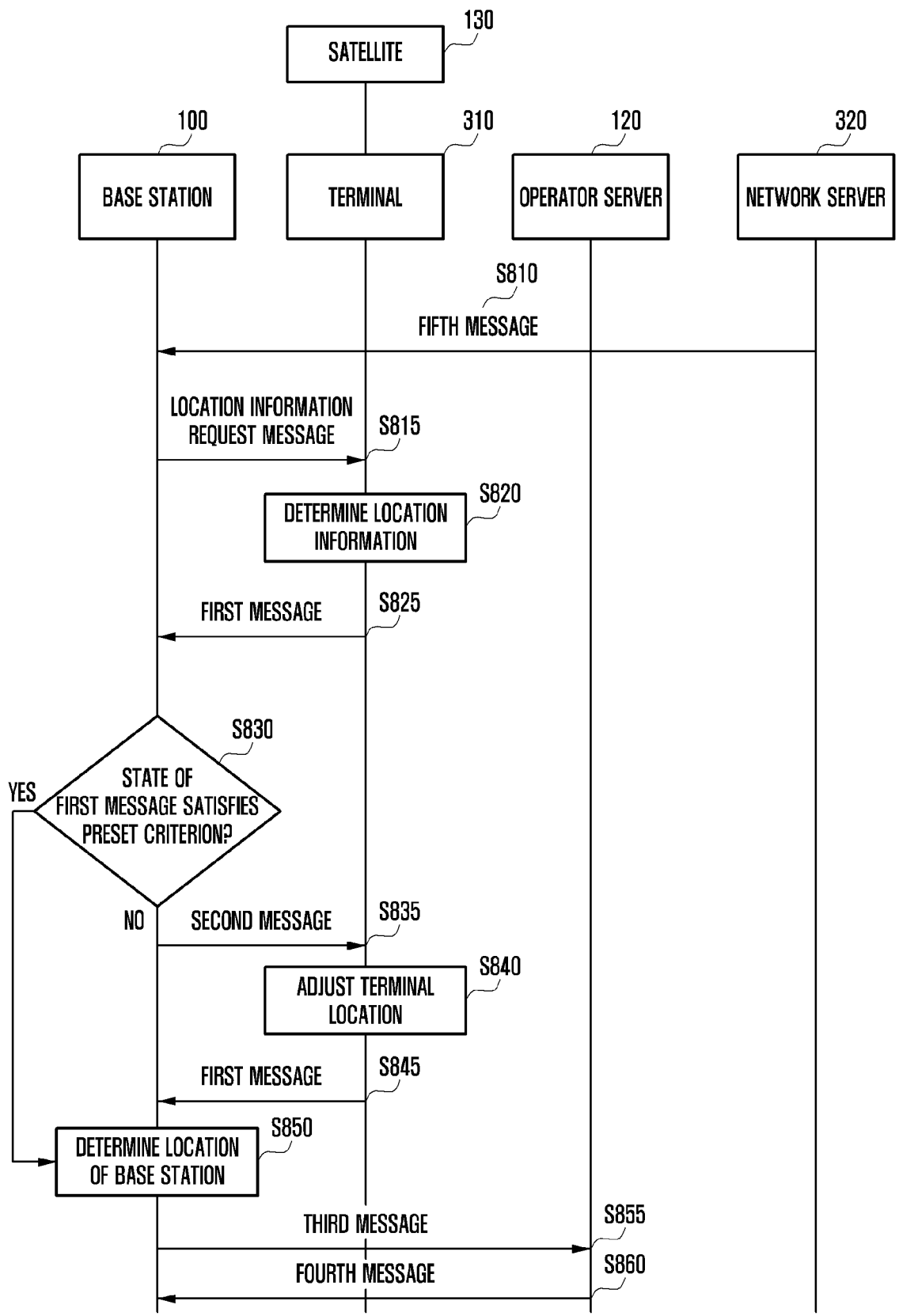
FIG. 8 is a sequence chart depicting a location determination method in the mobile communication system according to the disclosure.

FIG. 8 is a sequence chart depicting a location determination method in the mobile communication system according to the disclosure.

The mobile communication system according to the disclosure may include, as main components, a base station 100, a terminal 310, an operator server 120, a network server 320, and a satellite 130 communicating with the terminal 310.

At step S810, as described above, the network server 320 may transmit a fifth message to the base station 100 for synchronization. For the synchronization of the base station 100, the fifth message may include information on frequency and time domain synchronization.

Step S810 may be automatically performed at regular intervals for synchronization of the base station 100. Alternatively, when the base station 100 determines that the synchronization information is necessary (e.g., when the base station is turned on to provide a communication service to the terminal), step S810 may be performed.

When a certain trigger condition is satisfied in the base station 100 (when the base station is powered on, or when the location information of the base station is requested by the operator server as described above with reference to FIG. 4), at step S815, the base station 100 may transmit a request message for location information to the terminal 310.

Upon receiving the request message for location information, at step S820, the terminal 310 may determine the location information of the terminal 310. Typically, the terminal 310 may determine its location information based on the GPS information obtained through the communication with the satellite 130.

Thereafter, at step S825, the terminal 310 may transmit a first message containing the determined location information thereof to the base station 100. In addition to the determined location information, the first message may include information on the time of the terminal corresponding to the location information or information on the satellite communicating with the terminal.

At step S830, the base station 100 may determine whether the state of the first message satisfies a preset criterion. Upon determining that the state of the first message satisfies the preset criterion, as the location information of the terminal determined at step S820 is highly reliable, at step S850, the base station 100 may determine the location of the base station based on the location information of the terminal.

Upon determining that the state of the first message fails to satisfy the preset criterion at step S830, as the location information of the terminal determined at step S820 is regarded as unreliable, at step S835, the base station 100 may transmit a second message to the terminal 310 to obtain more reliable location information of the terminal.

Upon receiving the second message, at step S840, the terminal may adjust the location thereof through a series of operations (action A) shown in FIG. 8. As step S840 has been described with reference to FIG. 8, a detailed description thereof will be omitted herein.

After the location of the terminal 310 is adjusted at step S840, at step S845, the terminal 310 may transmit a first message to the base station 100 again. At step S850, the base station 100 may determine the location thereof based on the first message.

Although not shown in FIG. 11, after step S845 is performed, step S830 may be performed once again. After step S830 is performed, if the state of the first message still fails to satisfy the preset criterion, the base station 100 may transmit a second message for adjusting the location of the terminal to the terminal 310 again.

When the location of the base station is finally determined at step S850, at step S855, the base station 100 may transmit a fourth message to the operator server 120.

The operator server 120 may determine a frequency band that can be serviced by the base station 100 based on the fourth message. At step S860, the operator server 120 may transmit a fourth message including the determined frequency band information to the base station 100.

Figure 9:
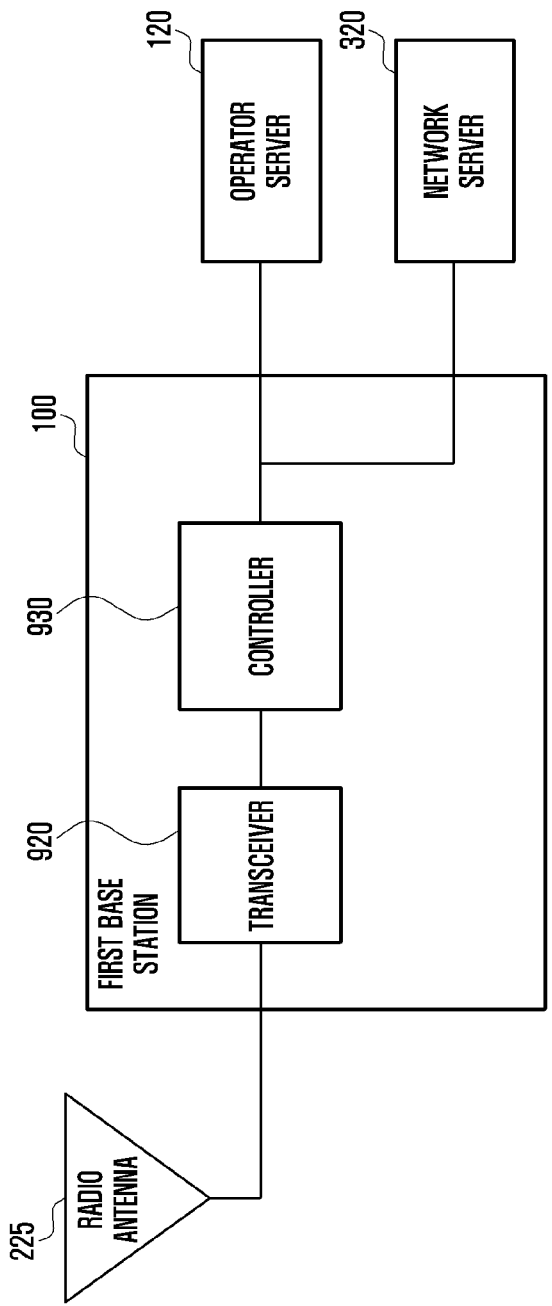
FIG. 9 is a block diagram of a base station according to the disclosure.

FIG. 9 is a block diagram of a base station according to the disclosure.

The base station 100 according to the disclosure may include a transceiver 920 configured to receive a first message containing location information of a terminal from the terminal, and a controller 930 configured to determine the location information of the base station based on the received location information of the terminal.

The transceiver 920 may transmit and receive a signal (including a first message) to and from the terminal through a radio antenna 225. Although not shown in FIG. 9, the base station 100 may further include a memory to store location information thereof.

In this case, the controller 930 may check whether location information of the base station is pre-stored in the memory, and, if location information of the base station is pre-stored in the memory, determine whether the pre-stored location information is valid. If the pre-stored location information of the base station is valid, the controller 930 may determine the pre-stored location information to be the location information of the base station.

As described above with reference to FIG. 4, the controller 930 may determine whether the pre-stored location information of the base station is valid based on the time when the location information is stored in the memory.

Meanwhile, the transceiver 920 may receive multiple first messages each including location information of the corresponding terminal from multiple terminals through the radio antenna 225. The controller 930 may determine the priorities of the terminals based on the states of the first messages, select a terminal to be used for determining the location information of the base station based on the priorities, and determine the location information of the base station based on the location information of the selected terminal. (This is described in detail with reference to FIG. 6).

In addition, the controller 930 may determine whether the state of the first message satisfies a preset criterion. If the state of the first message fails to satisfy the preset criterion, the transceiver 920 may transmit a second message for adjusting the location of the terminal to the terminal through the radio antenna 225.

As described above, the transceiver 920 may receive a third message including time information or frequency information from the network server 320. The controller 930 may achieve synchronization based on the time information or the frequency information.

Additionally, the controller 930 may store the determined location information of the base station in the memory as the location information of the base station. The transceiver 920 may transmit a fourth message including the location information of the base station to the operator server 120 through the radio antenna 225.

Figure 10:
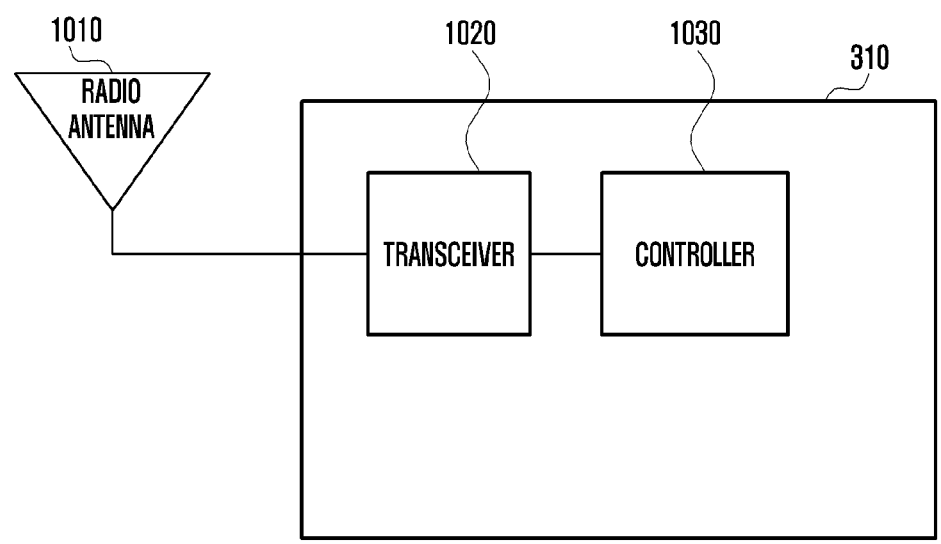
FIG. 10 is a block diagram of a terminal according to the disclosure.

FIG. 10 is a block diagram of a terminal according to the disclosure.

The terminal 310 according to the disclosure may include a transceiver 1020 that receives a request message for location information from the base station and transmits a first message including determined location information of the terminal to the base station through a radio antenna 1010, and a controller 1030 configured to determine the location information of the terminal according to the location information request message.

The terminal 310 may further include a display disposed on one surface of the terminal. The transceiver 1020 may receive a second message for adjusting the location of the terminal from the base station. The controller 1030 may execute a pre-installed application according to the second message and display the application execution result on the display.

As described above, the terminal according to the disclosure may further include a GPS transceiver (not shown) for transmitting and receiving GPS information to and from a satellite. The terminal may determine the location information thereof through the GPS transceiver.

In addition, if the terminal 310 communicates with the satellite through the GPS transceiver, the first message transmitted by the terminal 310 to the base station may include time information of the terminal or information on the satellite communicating with the terminal.

Figure 11A:
FIG. 11A is a screen representation illustrating the state where an application related to the disclosure is installed in the terminal.
Figure 11B:
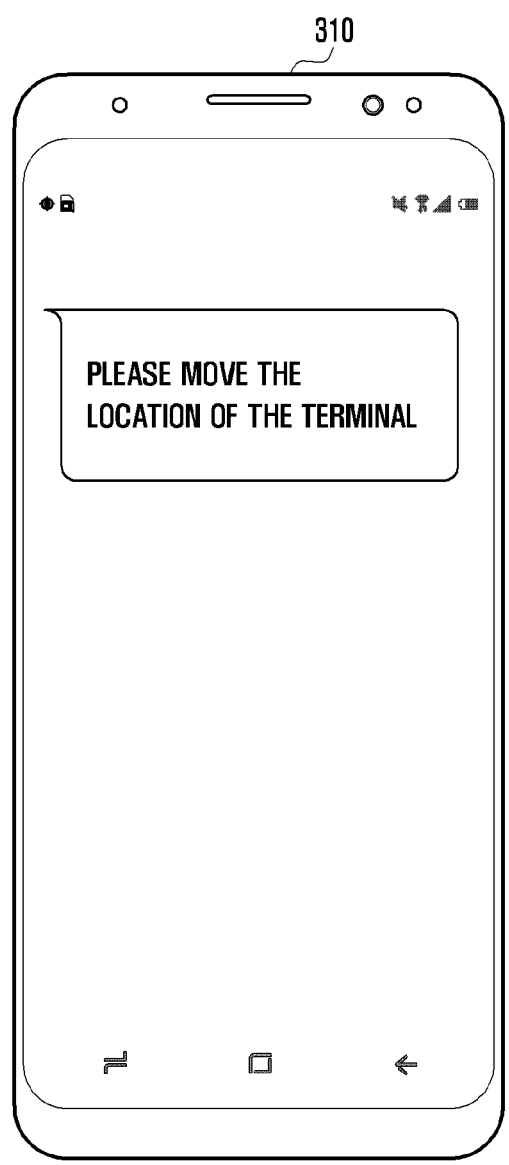
FIG. 11B is a screen representation illustrating the state where a message is displayed by the terminal when the application related to the disclosure is executed.

FIG. 11A is a screen representation illustrating the state where an application related to the disclosure is installed in the terminal. FIG. 11B is a screen representation illustrating the state where a message is displayed by the terminal when the application related to the disclosure is executed.

As described above with reference to FIG. 7, the terminal 310 may receive the second message at step S740 and may automatically execute an application 1110 corresponding to the second message.

Alternatively, to notify the user of reception of the second message, the terminal 310 may provide a push message to prompt the user to execute the application 1110. As described above, the method of notifying the user that the second message has been received may use alarms and vibrations as well as push messages.

When the application is executed in this manner, the application may provide the user with a message "Please move the terminal location" as shown in FIG. 11B.

That is, this message may prompt the user using the terminal 310 to move the location of the terminal to another location that can increase the reliability of the location information of the terminal.

In FIG. 11B, the message "Please move the location of the terminal" is displayed. Alternatively, a more specific message such as "Please move the terminal closer to the base station" may be displayed.

Not only such a text message but also a voice message may be delivered to prompt the user to move the terminal to a different location. It is also possible to use vibrations to prompt the user to check the message displayed on the terminal.

Meanwhile, in the description, it is assumed that the base station and the terminal are connected through a mobile communication system, but the base station and the terminal may be connected through a short range wireless communication system (e.g., Bluetooth). That is, the scope of the disclosure should not be limited by the connection mechanism between the base station and the terminal or between the base station, the operator server and the network server.

Hereinabove, embodiments of the disclosure have been described with reference to the accompanying drawings for the purpose of illustration without limiting the subject matter of the disclosure. It should be understood that many variations and modifications of the basic inventive concept described herein will still fall within the spirit and scope of the disclosure as defined in the appended claims and their equivalents. In addition, the above embodiments may be combined with each other as necessary. For example, the first embodiment, second embodiment, and third embodiment of the disclosure may be partially or fully combined and applied to the base station and the terminal. Although the description of the embodiments is focused on the LTE systems, it should be understood by those skilled in the art that the subject matter of the disclosure is applicable to other systems having similar technical backgrounds such as 5G or NR systems without significant modifications departing from the scope of the disclosure.

The invention claimed is:

1. A method performed by a base station for determining a location in a mobile communication system, the method comprising:
   transmitting, to each of a plurality of terminals, a request message including a location information request;
   receiving, from the plurality of terminals, first messages including location information of each of the plurality of terminals corresponding to the request message;
   determining a priority of each of the plurality of terminals based on a state of the first messages;
   selecting a corresponding terminal to be used for determining location information of the base station based on the determined priority; and
   determining the location information of the base station based on location information of the selected corresponding terminal.

2. The method of claim 1, further comprising:
   determining whether a state of the first message satisfies a preset criterion; and
   transmitting, to the terminal, a second message for adjusting a location of the terminal, in case that the state of the first message does not satisfy the preset criterion.

3. The method of claim 1, further comprising:
   transmitting, to an operator server, a third message including the determined location information of the base station; and
   receiving, from the operator server, a fourth message including frequency band information determined based on the location information of the base station.

4. The method of claim 1, further comprising:
   determining whether the base station includes pre-stored location information of the base station;
   determining whether the pre-stored location information is valid based on time information stored in the base station in case that the base station includes the pre-stored location information of the base station; and
   determining the pre-stored location information as the location information of the base station in case that the pre-stored location information is valid.

5. The method of claim 1, further comprising:
   receiving, from a network server, a fifth message including time information or frequency information; and
   performing synchronization based on the received time information or the received frequency information.

6. A base station in a mobile communication system, comprising:
   a memory;
   a transceiver configured to:
      transmit, to each of a plurality of terminals, a request message including a location information request; and
      receive, from each of the plurality of terminals, first messages including location information of the terminal corresponding to the request message; and
   a controller operably connected to the memory and the transceiver, the controller configured to:
      determine a priority of each of the plurality of terminals based on a state of the first messages;
      select a corresponding terminal to be used for determining location information of the base station based on the determined priority; and
      determine the location information of the base station based on location information of the selected corresponding terminal.

7. The base station of claim 6, wherein the controller is further configured to:
   determine whether a state of the first message satisfies a preset criterion, and
   control the transceiver to transmit, to the terminal, in case that the state of the first message does not satisfy the preset criterion, a second message for adjusting a location of the terminal.

8. The base station of claim 6, wherein the controller is further configured to control the transceiver to:
   transmit, to an operator server, a third message including the determined location information of the base station; and
   receive, from the operator server, a fourth message including frequency band information determined based on the location information of the base station.

9. The base station of claim 6,
   wherein the controller is further configured to:
      determine whether the base station includes pre-stored location information of the base station;
      determine whether the pre-stored location information is valid based on time information stored in the base station in case that the base station includes the pre-stored location information of the base station; and
      determine the pre-stored location information as the location information of the base station in case that the pre-stored location information is valid.

10. The base station of claim 9, wherein the controller is further configured to:
- identify whether the pre-stored location information of the base station is valid based on time information stored in the memory; and
- store the determined pre-stored location information of the base station as the location information of the base station in the memory.

\* \* \* \* \*